US006622187B1

(12) United States Patent
Brune et al.

(10) Patent No.: US 6,622,187 B1
(45) Date of Patent: Sep. 16, 2003

(54) METHOD FOR PRE-PROCESSING DATA PACKETS

(75) Inventors: Thomas Brune, Hannover (DE); Ralf Ostermann, Hannover (DE); Jens Cahnbley, Reinstorf/Suelbeck (DE); Siegfried Schweidler, Gehrden (DE)

(73) Assignee: Thomson Licensing S.A., Boulogne (FR)

( * ) Notice: Subject to any disclaimer, the term of this patent is extended or adjusted under 35 U.S.C. 154(b) by 415 days.

(21) Appl. No.: 09/583,056

(22) Filed: May 30, 2000

(30) Foreign Application Priority Data

May 31, 1999 (EP) .............................. 99110490
Jan. 26, 2000 (EP) .............................. 00250024

(51) Int. Cl.[7] .......................... G06F 13/00; G06F 13/14
(52) U.S. Cl. ...................................... 710/100; 710/305
(58) Field of Search ................................ 710/100, 305, 710/65, 66, 105, 308

(56) References Cited

U.S. PATENT DOCUMENTS

| 5,737,638 A | * | 4/1998 | Byrn et al. ................. 710/68 |
| 5,781,923 A | | 7/1998 | Hunt |
| 5,819,283 A | * | 10/1998 | Turkowski ................. 707/103 |
| 5,845,145 A | | 12/1998 | James et al. |
| 5,875,313 A | | 2/1999 | Sescila, III et al. |
| 5,961,640 A | * | 10/1999 | Chambers et al. .......... 712/300 |
| 6,167,480 A | * | 12/2000 | Williams et al. ............ 710/260 |
| 6,388,586 B1 | * | 5/2002 | Fischer et al. .............. 341/551 |

FOREIGN PATENT DOCUMENTS

EP  0 751 655 A2  1/1997  .......... H04L/29/06

OTHER PUBLICATIONS

FireWire System Architecture.
European Search Report.

* cited by examiner

Primary Examiner—Xuan M. Thai
Assistant Examiner—Tim Vo
(74) Attorney, Agent, or Firm—Joseph S. Tripoli; Paul P. Kiel

(57) ABSTRACT

The IEEE1394 bus communication protocol has three layers: physical layer, link layer, and transaction layer. A link layer IC implements the interface to an external application and prepares data for sending on the bus, or interprets incoming data packets from the IEEE1394 bus. A physical layer IC implements the direct electrical connection to the bus and controls many functions including arbitration for sending data on the bus. A problem exists due to the fact that the header data of the IEEE1394 asynchronous data packets consists of 32 bit words which have to be interpreted as 32 bit words in the connected application data processing unit (30). The IEEE1394 bus interface unit (20) is defined to be of big endian type. In a little endian type application data processor (30) the data word order can only be correctly interpreted after a byte order change. According to the invention the byte order change is performed in the data link layer unit (21) automatically with hardware circuitry for asynchronous data packets.

6 Claims, 6 Drawing Sheets

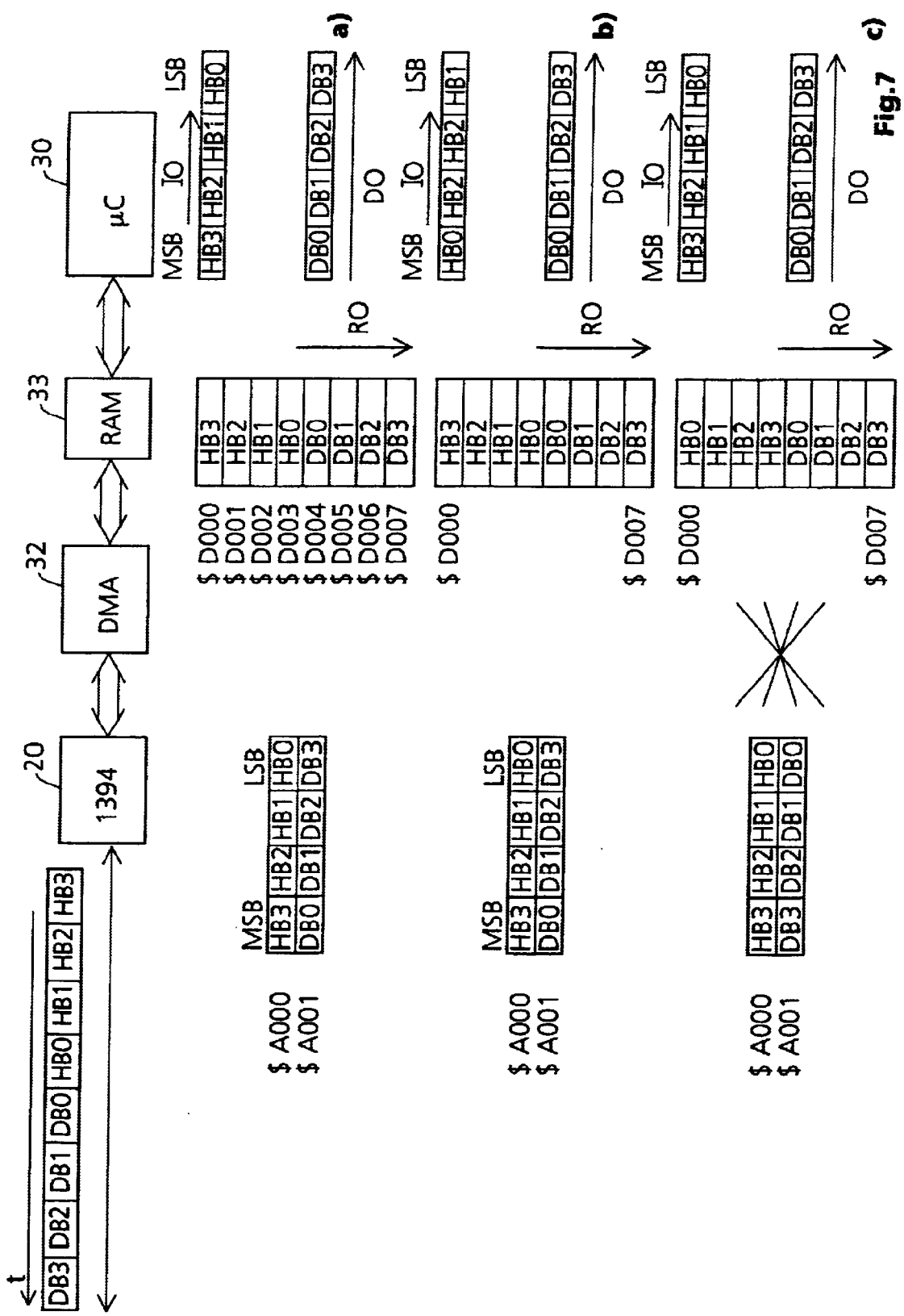

METHOD FOR PRE-PROCESSING DATA PACKETS

The present invention relates to a method for pre-processing data packets in a bus interface unit received via a communication bus and bus interface unit for use within this method as well as an application data processing unit for use within this method.

BACKGROUND OF THE INVENTION

A high sophistic communication bus is the IEEE1394 bus which is a low cost, high performance serial bus. It has a read/write memory architecture and a highly sophisticated communication protocol. Data rates of 100, 200 or 400 Mbit/s can be transmitted in nearly real time. Simultaneously, data can be transmitted bi-directionally. The first ten bits of transmitted address values refer to one of up to 1023 possible IEEE1394 bus clusters. The following six bits of the transmitted address values refer within a specific cluster to one of up to 63 nodes to which an application or device is assigned. Data between nodes can be exchanged without interaction of a host controller. Devices can be connected to or disrupted from the network at any time, allowing a plug and play behaviour.

The communication protocol has three layers: physical layer, data link layer, and transaction layer. Typically, the transaction layer is realised by firmware which means by software within an application data processing unit or control processor of a bus station whereas the other layers are implemented in the bus interface unit using chip sets.

The physical layer contains analogue transceivers and a digital state machine. It handles bus auto-configuration and hot plug. It reclocks, regenerates and repeats all packets and forwards all data packets to the local data link layer. It carries out-packet framing, for example speed code, prefix, and packet end assembling. It arbitrates and transmits packets from the local link layer. Available IC types are e.g. TSB11C01, TSB11LV01, TSB21LV03, and TSB41LV03 of Texas Instruments, MB86611 of Fujitsu, and 21S750 of IBM.

The data link layer performs all steps for distributing data packets to its destination. It recognises packets addressed to the node by address recognition and decodes the packet headers. It delivers packets to higher layers and generates packets from higher layers. It works either isochronous for AV data use or asynchronous for control data use.

In the isochronous mode a channel having a guaranteed bandwidth is established. There is a defined latency. The transmission is performed in 125 μs time slots or cycles. This mode has a higher priority than the asynchronous data transfer mode.

The asynchronous mode is not time critical, but safe. It operates as an acknowledged service with a busy and retry protocol. Fixed addresses are used. Transmission takes place when the bus is idle. The asynchronous mode handles read request/response, write request/response, and lock request/response. It performs cycle control, CRC generation and validation. Available data link layer IC types are e.g. TSB12C01A, TSB12LV21, TSB12LV31, and TSB12LV41 of Texas Instruments, and PDI1394L11 of Philips.

The transaction layer implements asynchronous bus transactions:

Read request/read response
Write request/write response
Lock request/lock response.

As mentioned above it can be implemented by software running on a microcontroller, such as e.g. the i960 of SparcLite. There may also be an AV (audio video) layer carrying out device control, connection management, timestamping, and packetising.

In IEEE1394 systems, the data link layer acts as an interface between an external application and the IEEE1394 bus (through the physical layer). The external application can be for example a consumer electronics device, such as a set-top-box or a VCR or a DVD player, which delivers/receives latency critical isochronous data and non-latency critical asynchronous data. Here, the asynchronous data packets are used for the controlling operations or register read/write/lock operations. Isochronous data packets contain information items like video-/audio data. The external application could also be a personal computer related device such as a Hard Disk Drive which delivers and receives asynchronous data packets only. Here, asynchronous data packets may include all kind of data inclusive audio/video data.

In IEEE1394 bus standard it is defined that the data packets are arranged in quadlets (one quadlet consists of four bytes corresponding to 32 Bit). It is also defined in this standard that the bus interface unit itself has to be of the big endian type which means that the byte order within a quadlet is so, that the most significant byte is stored in the lowest address, etc. A more detailed definition of this expression will be presented later on in the specification. There are two types of byte ordering schemes known from computer technology. One is the big endian type and the other is the little endian type. In little endian type microprocessors the bytes of a multi byte data word are stored from the little end on, i.e. the least significant byte is stored in the lowest address and so on. Both types are very often used in microelectronics. There are microcontrollers or microprocessors of either the big or little endian type available. When designing a bus station with IEEE1394 bus interface, the problem arises to arrange the byte-order of quadlets in the asynchronous data packet header in accordance to the target microcontroller's byte order because this header data has to be evaluated in the target microcontroller as the header data evaluation belongs to the transaction layer. One solution could be to do the byte reordering by software in the target microcontroller after reading the data from the bus interface unit. This solution has however the disadvantage that the target microcontroller has to include a byte reordering task if it is of little endian type which leads to a loss of performance on the target microcontroller site.

SUMMARY OF THE INVENTION

After recognising this disadvantage the invention consists first in the idea of doing the byte-order change of the header quadlets of the asynchronous data packets within the data link layer unit in hardware depending on an information item which clarifies whether the application data processing unit is of big or little endian type.

In case, where the data link layer unit has a register file with a number of registers having multi-byte data word entries, this solution has the disadvantage, that also the bytes of the entries in these registers need to be reordered when interpreted in a control processor if the control processor is of a different type as the link layer unit.

The invention therefore consists also in the second idea of doing a byte order change of the payload data field instead of changing the byte order in the header data field. By doing so, the multiplexing device for the byte reordering can be very simple because the controlling of the multiplexer need not to take into account other data components like register file entries.

Both solutions have the advantage that no processing power of the application data processing unit is required for byte reordering. Also, the software of the application data processing unit is simplified.

Advantageously, additional embodiments of the inventive method are disclosed in the respective dependent claims.

E.g. it is advantageous when the step of reordering the bytes of the payload data field is accompanied by a further reordering of the bytes in the header data field and the payload data field as claimed in claim 2. This can be done with another multiplexing device or very simply by making permanent hardwired cross connections in the data bus which transfers the data packet from the interface unit (20) to a memory (33) for the application data processing unit (30).

Writing the information item which clarifies whether the application data processing unit is of big or little endian type into the bus interface unit during initialisation according to claim 4 is an advantageous embodiment because during initialisation a lot of parameters have to be set within the bus interface unit anyway and the entry does not need to be changed during operation afterwards.

With the provision of byte order detection bits within an extra header according to claim 5 it is possible to easily verify the byte order in the application data processing unit during evaluation and testing. This can be basis for the transfer of said information item to the bus interface unit fully automatically. Such a software can be used for big and little endian machines. This simplifies the software adaptation in application data processing units. The software needs to be compiled only and is ready to run on big or little endian type machines.

The invention also consists in an advantageous embodiment of a bus interface unit for use in the method according to claims 1 to 6 and in an advantageous embodiment of an application data processing unit for use in the method according to claims 1 to 6.

BRIEF DESCRIPTION OF THE DRAWINGS

Embodiments of the invention are described with reference to the accompanying drawings, which show in:

FIG. 7 an illustation for explaining a second embodiment of the invention.

DETAILED DESCRIPTION OF PREFERRED EMBODIMENTS

At first the meaning of the expressions big endian and little endian is explained.

Big-endian and little-endian are terms that describe the order in which a sequence of bytes are stored in computer memory. Big-endian is an order in which the "big end" (most significant value in the sequence) is stored first (at the lowest storage address). Little-endian is an order in which the "little end" (least significant value in the sequence) is stored first. For example, in a big-endian computer, the two bytes required for the hexadecimal number 0x4F52 would be stored as 0x4F52 in storage (if 0x4F is stored at storage address 1000, for example, 0x52 will be at address 1001). In a little-endian system, it would be stored as 0x524F (0x52 at address 1000, 0x4F at 1001).

As already mentioned in the introduction, often multi-byte data words do exist in electronic devices. An example is the quadlet data word which consists of 4 bytes or 32 bit correspondingly. E.g. the data packets of the IEEE1394 bus are organised in quadlets which will be explained more detailed later on. Very often the memory space of a computer is organised in 8 bit memory words which means, that a quadlet has to be stored in 4 memory locations/addresses. Even if the memory space of a machine is organised in 32 bit words (quadlets) these machines very often have processing modes/processor commands where 8 bit memory accesses are being made. Note, that for the embodiments explained here, it is assumed that the memory is organised in 8 bit words.

Figure 1:
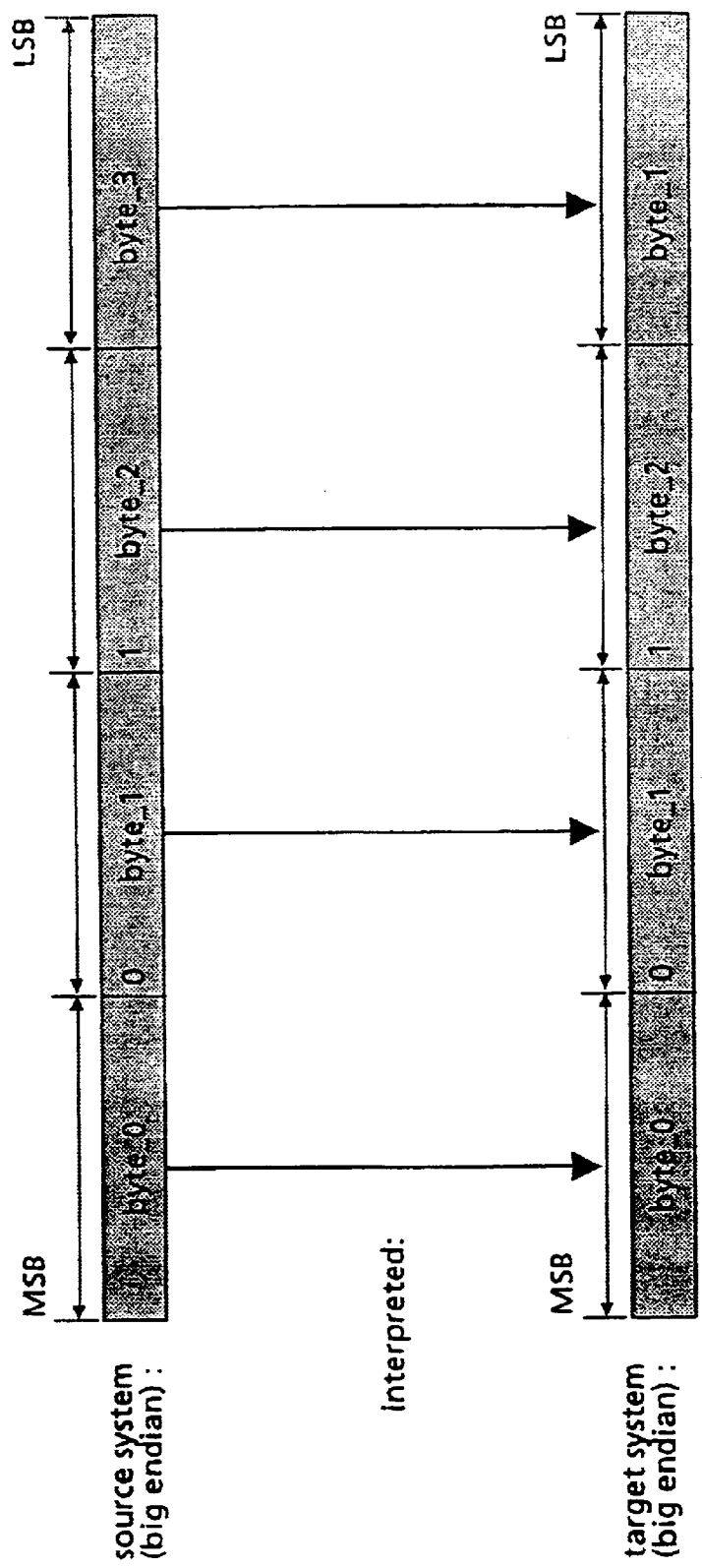
FIG. 1 an illustration for explaining the byte order interpretation in a big endian machine being connected to another big endian machine.
Figure 2:
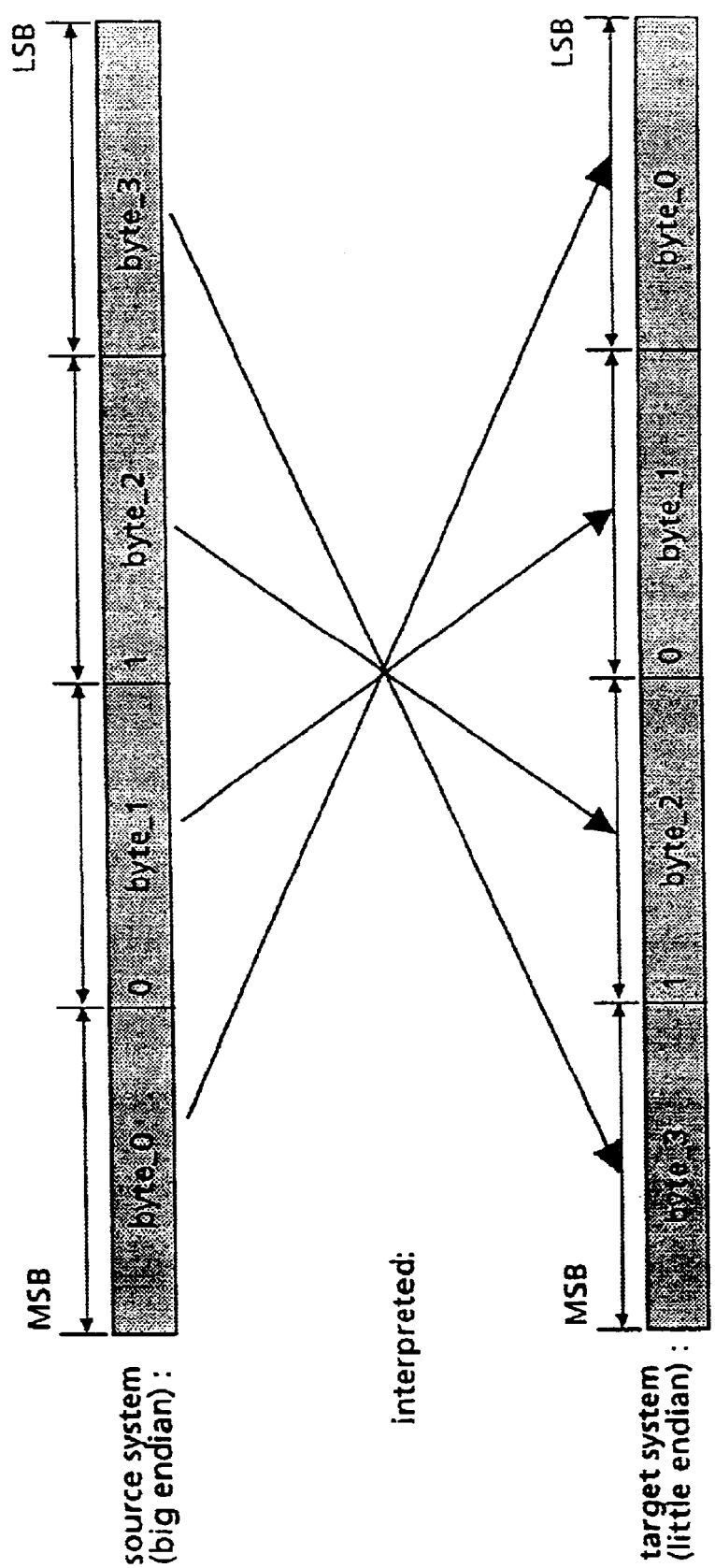
FIG. 2 an illustration for explaining the byte order interpretation in a little endian machine being connected to a big endian machine.

The principles of little and big endian modes are illustrated in FIGS. 1 and 2 for the example of a 32 bit word and 8 bit memory accesses. Two quadlets are shown in FIG. 1. The first one is stored in a 8 bit organised memory in a source system which is of big endian type. The second one is stored in an 8 bit organised memory of a target system which is also of big endian type.

The byte ordering in little endian systems is shown in FIG. 2 also for the example of a 32 bit word and 8 bit memory accesses. It is shown that the little endian machine assembles the quadlet from the opposite side on than the big endian machine. The little endian machine assumes that the most significant byte of the quadlet in memory is in the largest of the 4 addresses where the quadlet is stored and so on. The resulting interpreted quadlet has therefore the wrong byte order as shown in FIG. 2.

In IEEE1394 standard, reference is made to the Standard IEEE 1394-1995 IEEE Standard for a high performance serial bus, New York Aug. 30, 1996, a communication protocol is defined which is more and more used in Computer Technology and Consumer Electronics products.

The communication protocol allows for the transfer of isochronous and asynchronous data packets. The structure of this data packets is defined in IEEE1394 standard. Isochronous data packets are provided for the transfer of audio/video data because this kind of data occurs in regular time intervals with relatively stable amount in the source device. Typical applications are the transfer of coded audio and video data from a Set-Top-Box to a recording device like a video recorder, or from a satellite receiver to a Mini Disk player in case of audio data only, etc.

For MPEG2 coded audio and video data which are transferred with isochronous data packets a separate standard exists called IEC International Standard 61883-1, Consumer audio/video equipment—Digital interface, $1^{st}$ Edition 1998–02. Here, it is defined the structure of the isochronous data packets and also the rules how the packets have to be filled up with header data, timestamp data, etc. The headers within such a packet (1394 header and CIP header) are evaluated in the data link layer IC of the IEEE1394 interface. This means that the header data need not to be transferred to a microcontroller or CPU outside the bus interface.

The payload data of the isochronous packets concerns bit-stream data which is not to be interpreted generally in multi byte data form. The data bytes are shifted to an application data processing unit from the memory in the data link layer IC with direct memory access. A corresponding DMA unit is provided in these devices. The DMA unit is designed to read the data in the same order they have been written into memory of the interface unit and write them in memory of the application data processing unit in the same order. This means that for isochronous data packets there will not occur the byte ordering problem when transferring data to the application data processing unit.

For asynchronous data packets the situation is different. With asynchronous data packets every other kind of data than MPEG2 coded audio and video data is being transferred. In applications other than the typical consumer electronics devices it may happen that also coded audio and video data has to be transferred with asynchronous data packets. An example will be presented later on. According to the most IEEE1394 interface designs the evaluation of the asynchronous data packet headers which belongs to the transaction layer is not being done in the data link layer IC. They are evaluated in the data processing unit of the application and the byte ordering problem arises due to the fact that in one application the μC is of big endian type and in another device of little endian type.

Figure 3:
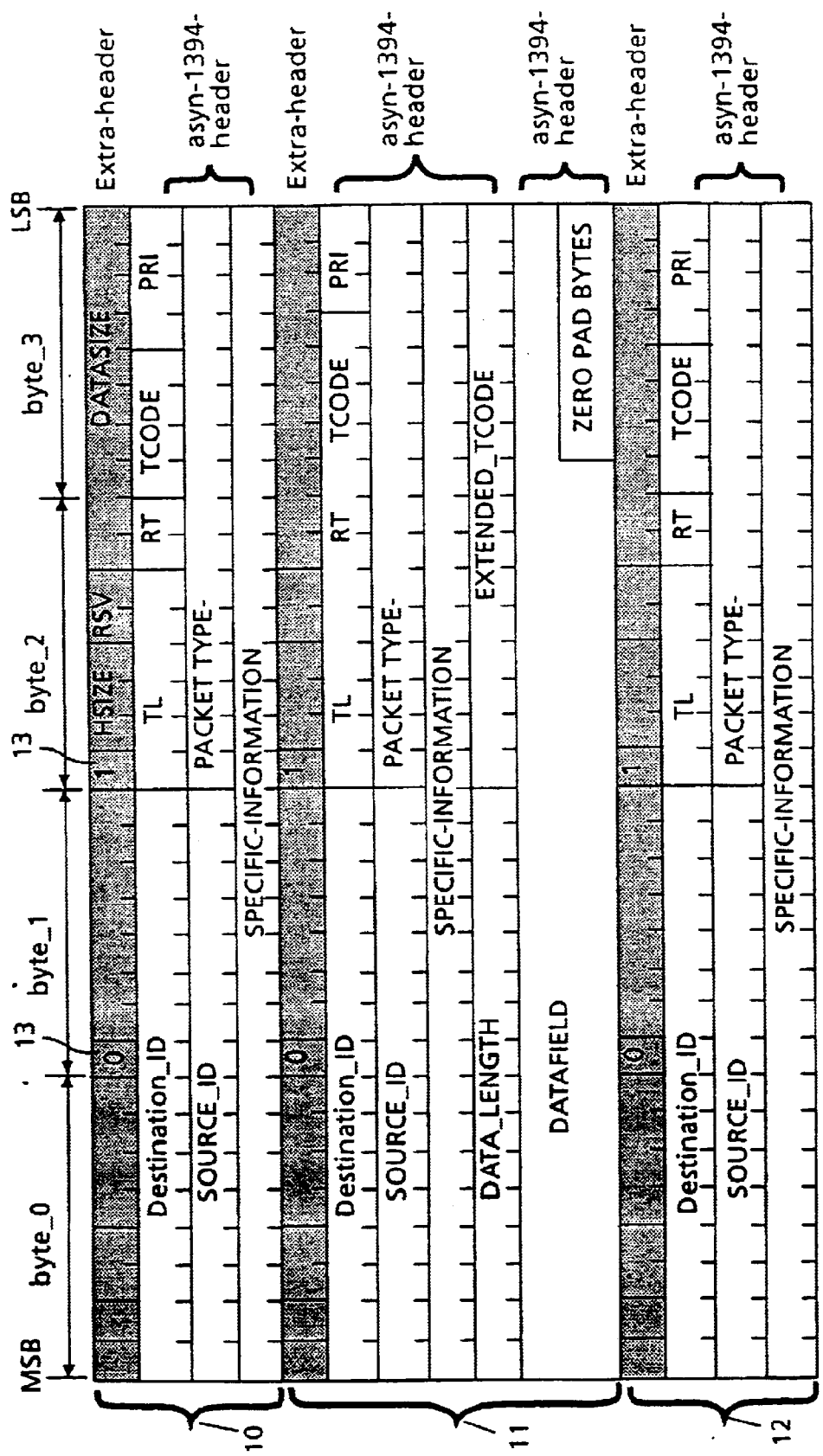
FIG. 3 the asynchronous packet structure for the IEEE1394 bus.

The structure of an asynchronous packet is shown in FIG. 3. Reference numbers 10 and 12 denote asynchronous packets without payload data. These packets consist of an extra header and an asynchronous 1394 header. The extra header is optional but it is used for control purposes within an application device or data link layer unit and in a specific embodiment of this invention for carrying two byte order detection bits 13. This will be explained later on. Reference number 12 denotes an asynchronous packet which also has a data field. The components of the asynchronous headers and extra headers are listed below:

| Name | Description |
|---|---|
| DESTINATION_ID | Destination Identification |
| TL | Transaction Label |
| RT | Retry Code |
| TCODE | Transaction Code |
| PRI | Priority |
| SOURCE_ID | Source Identification |
| PACKET TYPE SPECIFIC INFORMATION | Packet Type specific Information |
| DATA_LENGTH | Data Field Length |
| EXTENDED_TCODE | Transaction Code Extension |
| DATA FIELD | Data Field |
| ZERO PAD BYTES | Zero Padding Bytes |
| HSIZE | Header Field Size |
| RSV | Reserved |
| DATA SIZE | Data Field Size |

The meanings of the components of the asynchronous 1394 header are also fully described in above mentioned IEC 61883-1 standard. It is to be noted that the asynchronous header may consists of e.g. three or four quadlets depending of the asynchronous data packet type. It easily to be seen from FIG. 3 that the entries in the asynchronous header are not synchronised with the byte limits in a quadlet and therefore are sensitive to the byte order during evaluation. Asynchronous packets without data field may be used for the handshake protocol, e.g. for acknowledge messages and also for some sort of specific control messages like lock request for TV sets with child proof capability, etc.

Figure 4:
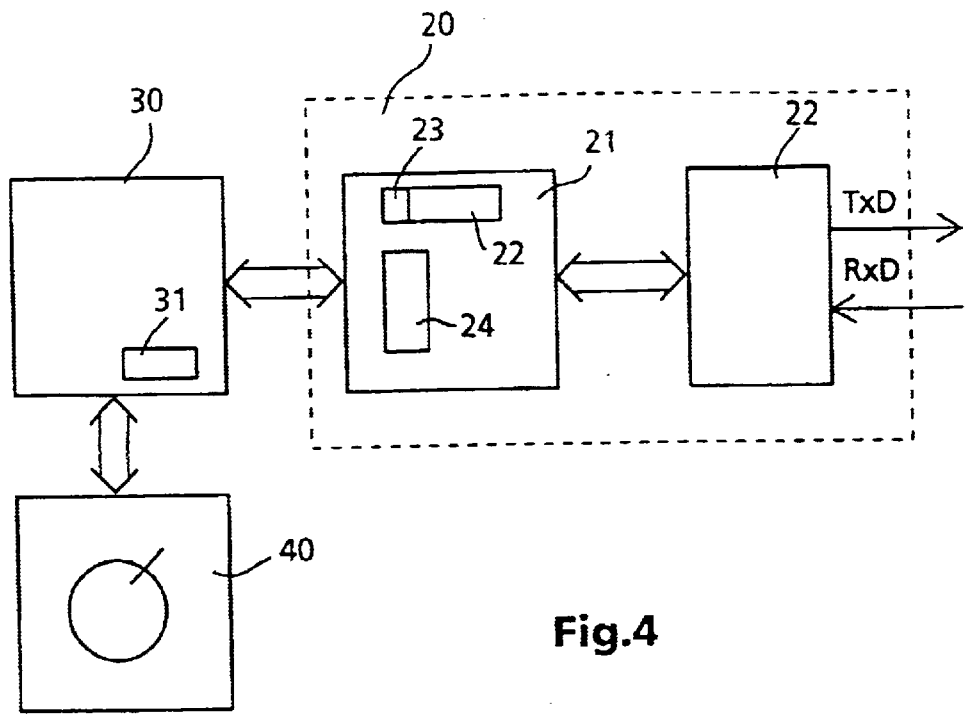
FIG. 4 a block diagram for a hard disk drive with IEEE1394 interface.

An example of a non-consumer application device is depicted in FIG. 4. It is the example of a hard disk drive with IEEE1394 interface. Reference number 20 denotes the IEEE1394 interface. Reference number 30 points to the application data processing unit which is used for controlling the HD-drive 40 e.g. according to the SCSI protocol. Application data processing unit 30 also has the task to evaluate the asynchronous header data according to the transaction layer services. For this purpose it is necessary to do a byte reordering in case where the application data processing unit is of little endian type. This is because the IEEE1394 data link IC is defined to be of big endian type in the IEEE1394 standard. In case where the application data processing unit is of big endian type there is no need to do the byte reordering.

According to the invention the byte reordering is done with a corresponding multiplexing device 24 under control of a little endian flag 23 in a status register 22. This flag is set during initialisation of the data link layer IC 21. Initialisation of this IC is done after power on with a specific programme running on the application data processing unit 30. In this programme a step must be inserted which sets the little endian flag to "1" in case the application data processing unit is of little endian type. The flag is set to "0" in case the application data processing unit is of big endian type.

Figure 5:
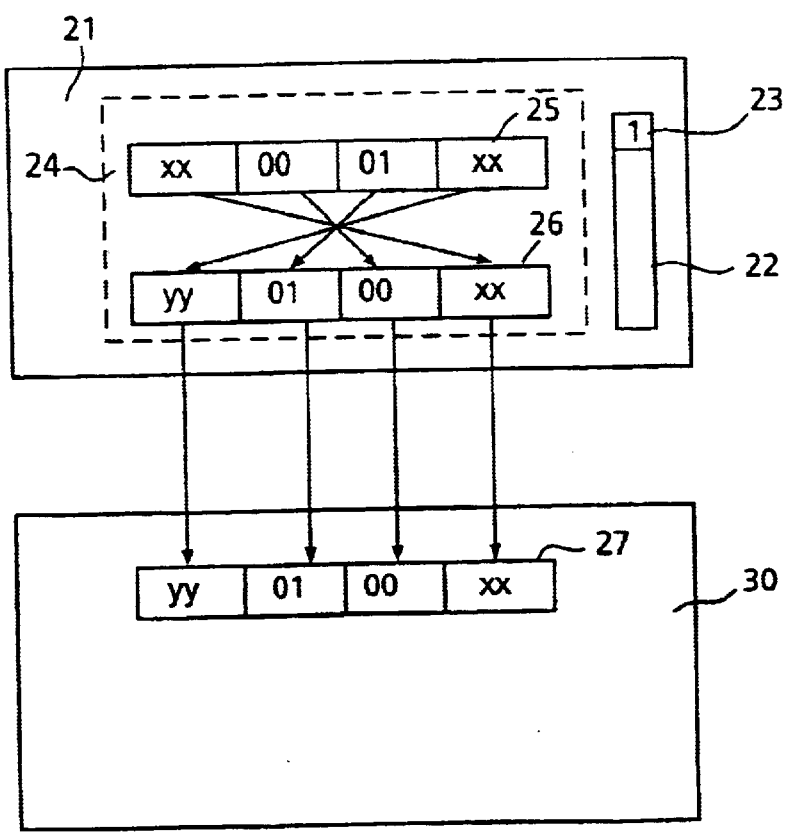
FIG. 5 an illustration for the byte order change process in a data link layer IC of a IEEE1394 bus interface.

The byte reordering step is illustrated in FIG. 5. Shown is one quadlet 25 of asynchronous 1394 header data for which the byte rearrangement is being made. This reordering is done automatically just after receipt of the asynchronous 1394 packet. When the application data processing unit accesses this data packet, it will receive the quadlets 27 of the header in right byte order and wrong results are avoided during evaluation. In case the little endian flag carries the entry "0", the automatic byte reordering for the header quadlets is switched off and the quadlets are transferred to the application data processing unit in unchanged byte order. The data field quadlets are not rearranged according to this embodiment because the payload data words are 8 bit data words which means in no time multi byte data words have to be interpreted. The payload data bytes are read out of memory with 8 bit accesses starting from the lowest address to the higher addresses.

The problem of controlling the multiplexing device for reordering e.g. either four or five quadlets is easily solved with the help of the extra headers for the different packets. The structure of the extra headers is not defined in IEEE1394 standard. This is an optional header and it can be used for control purposes within an application device or in the data link layer unit. In the mode where data packets are received from IEEE1394 bus the extra header is generated in the data link layer IC within the 1394 interface. In FIG. 3 it is shown that the extra header has an entry for the header size and also an entry for the data field size. The header size or the data size entry needs to be evaluated before making the byte reordering. This can be easily done with two flip-flop sets which are set each time a quadlet has been rearranged and the resorting being stopped after four/five flip-flops have been set. The selection between the values four and five is made with the help of the entry in the extra header for the header size. Only a few logic gates are necessary for this purpose.

Figure 6:
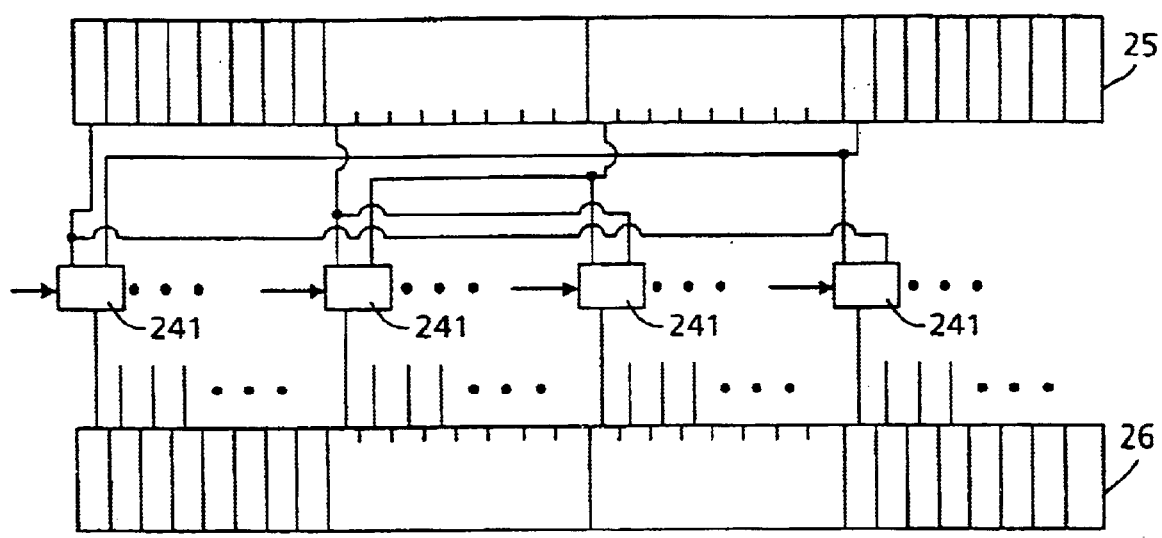
FIG. 6 a block diagram of the hardware unit which performs the byte order change in a data link layer IC of a IEEE1394 bus interface.

The structure of the multiplexing device is shown in FIG. 6. It consists of multiplexing stages 241 to which as inputs the corresponding bits of the bytes which are to be exchanged are fed. The outputs of these multiplexing stages is fed to the corresponding bits of the output register 26. Each multiplexer 241 is controlled with the little endian flag 23.

In FIG. 3 it is also shown that the extra header has two entries 13 which are called byte order detection bits. In every extra header, the first byte order detection bit is set to "0" and the second one is set to "1". With these two bits it is possible to easily detect the packet headers byte order after transfer to the application data processing unit. This is because the right byte order is indicated when the second most significant byte has in its most significant bit a "0" entry and the third most significant byte has in its most significant bit a "1" entry.

With these byte order detection bits it is possible to improve the software running on the application data processing unit so that it is able to dynamically adapt to the byte order interpretation of the application data processing unit fully automatically. During first time initialisation the software asks for an asychronous packet and evaluates the byte order detection bits. With this result it knows whether it is a big or little endian machine and can set the corresponding parameters for the future initialisations. A software engineer needs not to take care of the big and little endian problem with this more general software.

Next, another embodiment of the invention is explained in detail. Reference is made to FIG. 7 for this purpose. In FIG. 7a it is shown the order of transmission of 4 header bytes HB0 to HB3 and 4 payload data bytes DB0 to DB3. The received bytes are written into the internal memory of the IEEE1394 interface unit in this order where $A000 to $A001 denotes the addresses of the 32 bit organised internal memory. The MSB of the header quadlet is HB3 and the LSB is HB0. The received data words are transferred to an external memory 33. This is done without help of the application CPU 30 using direct memory access unit 32. The data bus between external memory 33 and interface unit 20 is supposed to be a 32 bit bus. The external memory 33 is 8 bit organised. Thus, the two received quadlets occupy the address space of $D000 to $D007 in the external memory 33. It can be seen, that the MSB of the header quadlet HB3 is stored in the first memory location $D000 and the LSB of the header quadlet HB0 is stored under address $D003. The first data byte DB0 of the payload data field is stored under address $D004 and the last data byte DB3 is stored under address $D007. This is the storing order, when no byte reordering is being made. In FIG. 7a it is supposed, that CPU 30 is of big endian type. Then the CPU 30 will do the interpretation of the header quadlet under addresses $D000 to $D003 in the right order. It will interpret the byte in memory location $D000 as the MSB of the header quadlet and the byte in memory location $D003 as the LSB of the header quadlet. For decoding the data bytes of the payload data field, the data bytes will be read out of memory in the reading order RO as shown. The decoding order DO in application μC 30 is therefore right in this case.

In FIG. 7b it is supposed that μC 30 is of little endian type. In this case the interpretation of the header quadlet will be wrong. The little endian machine will interpret header byte HB0 as MSB and header byte HB3 as LSB. The decoding order of the payload data bytes in memory will be right and there is no difference to the first case, as can be seen in FIG. 7b.

In FIG. 7c it is supposed that μC 30 is of little endian type. In order to achieve the right header quadlet interpretation, the following is done: The byte order within the 32 bit data bus connection between memory 33 and IEEE1394 interface 20 is changed simply by making corresponding hardwired crossings. Of course, this is fixed for all the operation time of the device and cannot be changed during operation. This fixed byte order change is indicated in FIG. 7c with the crossing symbol between IEEE1394 interface unit 20 and memory 33. Of course, by doing so all the quadlets from the internal memory in unit 20 will be subject of byte order change. This is valid for the header and the payload data field of a received packet. From FIG. 7b it is known that the data bytes of the payload data field will be decoded in the right order in the little endian machine. Thus, to avoid decoding errors, there is done a reordering of the payload data field quadlets in the interface unit 20. This is done automatically just after reception of a packet by a multiplexing device like the one shown in FIG. 6. So the byte order of the payload data field quadlets in the internal memory of interface unit 20 is changed. This is depicted in FIG. 7c. As a consequence, the byte order for the payload data field in memory 33 is identical to the cases shown in FIG. 7a and 7b but the byte order of the header quadlet is different. This results in the right interpretation of the header quadlet in the little endian μC 30 as well as in the right decoding order of the payload data bytes.

Modifications can be required for different implementations where e.g. the width of data bus connection between IEEE1394 interface unit 20 and external memory 33 is different, e.g. 16 bit or 8 bit. But the priniciples of the invention remain applicable.

What is claimed is:

1. Method for pre-processing data packets received via a communication bus in a bus interface unit, said data packets having a header data field and an optional payload data field, wherein at least said header data field is organised in a number of multi-byte data words, comprising the steps of:

for preparation of the data packet processing in an application data processing unit, reordering the bytes of the payload data field in dependence of an information item which clarifies whether said application data processing unit to which the data packet is addressed is of little endian type; and accompanying the reordering step with further reordering of the bytes in the header data field and the payload data field.

2. Method according to claim 1, wherein the further reordering of the bytes in the header data field and the payload data field is done by making permanent hardwired cross connections in the data bus which transfers the data packet from the bus interface unit to a memory of the application data processing unit.

3. Method according to claim 1, further comprising the step of writing said information item into said bus interface unit during initialisation of said bus interface unit.

4. Method according to claim 1, further comprising the step of adding an extra header to said data packets in said bus interface unit and placing two byte order detection bits in two bytes of a multi byte data word of said extra header.

5. Method according to claim 1, wherein said communication bus is a IEEE1394 compliant bus and said data packets which are subject of byte reordering are asynchronous data packets.

6. Bus interface unit comprising:

a status register including a little or big endian flag which is set during initialisation; and a byte reordering circuit which receives via a communication bus in the bus interface unit data packets having a header data field and a payload data field, wherein at least said header data field is organized in a number of multi-byte data words, and reorders either the bytes of the multi byte data words of the header data fields of said data packets or the bytes of the payload data field under control of the entry within said little or big endian flag, wherein for preparation of data packet processing in an application data processing unit the byte reordering circuit reorders the bytes of the payload data field in dependence of an information item which clarifies whether said application data processing unit to which the data packet is addressed is of big or little endian type.

* * * * *